United States Patent
Haskamp et al.

(10) Patent No.: US 10,035,399 B2
(45) Date of Patent: Jul. 31, 2018

(54) MECHANICAL COMPONENT HAVING A CYLINDRICAL NANOTUBE FORCE SENSOR

(71) Applicant: ZF Friedrichshafen AG, Friedrichshafen (DE)

(72) Inventors: Klaus Haskamp, Dinklage (DE); Michael Klank, Osnabrück (DE); Peter Hofmann, Starnberg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 15/527,782

(22) PCT Filed: Oct. 19, 2015

(86) PCT No.: PCT/EP2015/074086
§ 371 (c)(1),
(2) Date: May 18, 2017

(87) PCT Pub. No.: WO2016/078845
PCT Pub. Date: May 26, 2016

(65) Prior Publication Data
US 2017/0320369 A1    Nov. 9, 2017

(30) Foreign Application Priority Data
Nov. 20, 2014 (DE) .......... 10 2014 223 657

(51) Int. Cl.
*G01L 1/00* (2006.01)
*B60G 17/019* (2006.01)
*G01L 1/22* (2006.01)

(52) U.S. Cl.
CPC .......... *B60G 17/019* (2013.01); *G01L 1/2293* (2013.01); *B60G 2204/1162* (2013.01); *B60G 2204/416* (2013.01)

(58) Field of Classification Search
CPC .......... B60G 17/019; B60G 2204/1162; B60G 2204/416; G01L 1/2293
(Continued)

(56) References Cited

U.S. PATENT DOCUMENTS

| 6,422,089 B1 | 7/2002 | Madden et al. |
| 7,278,324 B2 | 10/2007 | Smits et al. |

(Continued)

FOREIGN PATENT DOCUMENTS

| DE | 35 34 711 A1 | 4/1987 |
| DE | 36 30 749 A1 | 3/1988 |

(Continued)

OTHER PUBLICATIONS

German Search Report Corresponding to 10 2014 223 657.6 dated Sep. 14, 2015.
(Continued)

*Primary Examiner* — Max Noori
(74) *Attorney, Agent, or Firm* — Davis & Bujold PLLC; Michael J. Bujold

(57) ABSTRACT

A mechanical component for a vehicle, such as a ball stud, having a cylindrical measurement region with an outer surface. A force sensor is associated with the cylindrical measurement region for detecting at least one force to which the component is exposed. The forces detected by the nanotube sensor may include compressive and/or tensile stress forces. The force sensor includes a layer of carbon nanotubes applied to the outer surface of the cylindrical measurement region.

11 Claims, 1 Drawing Sheet

(58) Field of Classification Search
USPC .................................................. 73/862.68
See application file for complete search history.

(56) References Cited

U.S. PATENT DOCUMENTS

| | | | |
|---|---|---|---|
| 7,357,036 B2 | 4/2008 | Steprath | |
| 7,730,547 B2 | 6/2010 | Barrera et al. | |
| 7,895,908 B2 | 3/2011 | Fujiwara et al. | |
| 9,249,820 B2 | 2/2016 | Groche et al. | |
| 9,557,837 B2* | 1/2017 | Yang | G06F 3/041 |
| 9,618,403 B2* | 4/2017 | Li | G01L 1/00 |
| 2012/0258302 A1* | 10/2012 | Hunt | B82Y 30/00 |
| | | | 428/300.7 |
| 2012/0292871 A1 | 11/2012 | Wittmann et al. | |
| 2013/0031987 A1 | 2/2013 | Beauvais et al. | |
| 2013/0104665 A1* | 5/2013 | Biris | D01F 9/127 |
| | | | 73/774 |
| 2013/0118267 A1* | 5/2013 | Suzuki | G01B 7/18 |
| | | | 73/774 |
| 2013/0312535 A1 | 11/2013 | Dunleavy et al. | |
| 2015/0006054 A1 | 1/2015 | Hofmann et al. | |
| 2017/0241847 A1* | 8/2017 | Loh | D06M 15/693 |

FOREIGN PATENT DOCUMENTS

| | | |
|---|---|---|
| DE | 10 2005 005 354 A1 | 8/2006 |
| DE | 10 2011 117 519 A1 | 5/2013 |
| DE | 10 2011 089 605 A1 | 6/2013 |
| DE | 10 2012 005 614 A1 | 9/2013 |
| DE | 10 2013 213 672 A1 | 1/2015 |
| EP | 2 524 827 A1 | 11/2012 |
| EP | 2 589 503 A1 | 5/2013 |
| GB | 2246864 A | 2/1992 |
| WO | 2004-065926 A1 | 8/2004 |
| WO | 2011/065921 A1 | 6/2011 |

OTHER PUBLICATIONS

German Search Report Corresponding to 10 2014 223 654.1 dated Sep. 14, 2015.
International Search Report Corresponding to PCT/EP2015/074086 dated Jan. 13, 2016.
International Search Report Corresponding to PCT/EP2015/074085 dated Jan. 13, 2016.
Written Opinion Corresponding to PCT/EP2015/074086 dated Jan. 13, 2016.
Written Opinion Corresponding to PCT/EP2015/074085 dated Jan. 13, 2016.

* cited by examiner

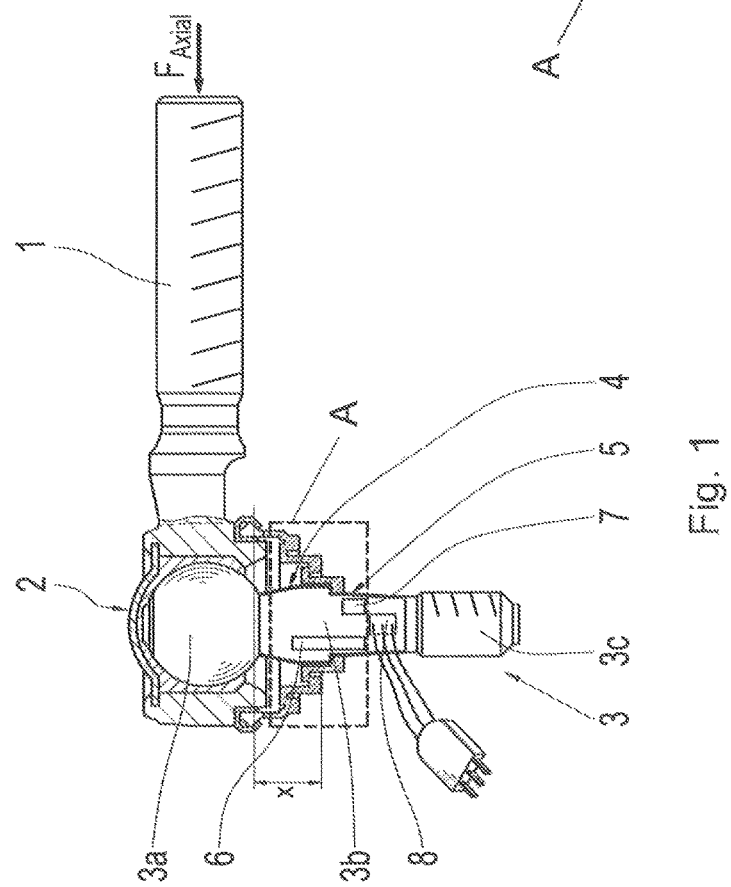
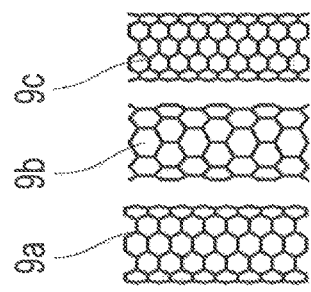
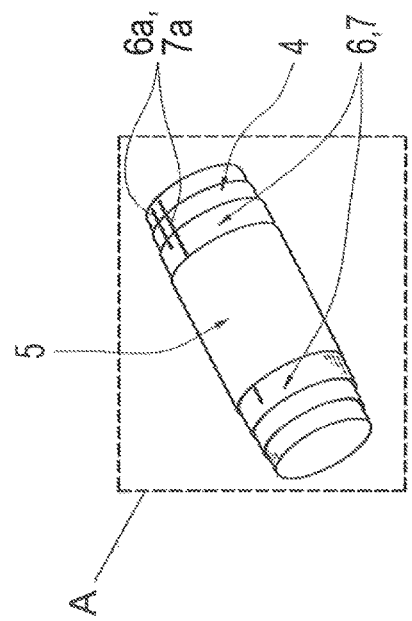
Fig. 2A  Fig. 2B  Fig. 2C
Fig. 3
Fig. 1

MECHANICAL COMPONENT HAVING A CYLINDRICAL NANOTUBE FORCE SENSOR

This application is a National Stage completion of PCT/EP2015/074086 filed Oct. 19, 2015, which claims priority from German patent application serial no. 10 2014 223 657.6 filed Nov. 20, 2014.

FIELD OF THE INVENTION

The invention relates to a mechanical component for a vehicle, comprising a measurement region having a surface, and a force sensor associated with the measurement region for detecting a force to which the component is exposed. The invention also relates to a use of a special force sensor.

BACKGROUND OF THE INVENTION

The earlier application of the Applicant with the application number DE 10 2013 213 672.2 discloses a mechanical component having a force sensor, wherein the mechanical component is formed in one preferred embodiment as a pendulum support and the force sensor is formed as a flexible deformation element, which is connected in a form-fitting manner to the pendulum support within a measurement region. The deformation element acts as a means to intensify a mechanical stress in the rod-shaped pendulum support, in which tensile and compressive stresses principally occur. The compression or stretching of the pendulum support resulting from a compressive or tensile stress is conveyed to the curved shaped deformation element and produces a bending, by which means the stretching or compression is intensified. The mechanical change of the deformation element, which is produced from a magnetic material, is associated with a change in the magnetic field, which is measurable and which can be converted into electrical signals. The deformation of the deformation element is detected by means of suitable sensor technology, preferably with realization of a magnetic field measurement.

Document DE 10 2011 117 519 A1 disclosed a trailer coupling with a force sensor, wherein the force sensor is preferably formed as a strain gauge and is disposed on the surface of the coupling hook.

The problem addressed by the present invention is to exploit further potential for the measurement of force on mechanical components.

SUMMARY OF THE INVENTION

The problem addressed by the invention is solved by means of the features of the independent claims and the advantageous embodiments that emerge from the dependent claims.

According to one first aspect of the invention, it is envisaged that the force sensor is formed as a layer of carbon nanotubes (CNT) applied to the surface of the measurement region. The material carbon nanotubes, hereafter referred to as CNT, is known per se: these are microscopically small tubular structures made of carbon. The CNT material which is used according to the invention is electrically conductive and also has the characteristic that it changes its electrical resistance in the event of a mechanical stress, e.g. a stretching or compression as a consequence of a force application. This effect is made use of according to the invention in order to employ the CNT material as the sensitive element of a force sensor. The CNT material is applied as a layer to the surface of the claimed component. This has the advantage that the sensitive element lies directly in the component's flux of force, i.e. a stretching or compression of the claimed component is conveyed directly to the CNT layer, which adheres to the surface of the component. This results in a precise force measurement. It is furthermore advantageous that the CNT material, which is contained in a suitable binder, preferably in the form of a varnish, can be easily applied to the component, preferably by means of brushing on.

According to one preferred embodiment, an insulating layer is disposed between the CNT layer and the surface of the component, which insulating layer insulates the electrically conductive CNT layer against the electrically conductive component. The CNT layer can thus be applied after the introduction of the insulating layer.

If the mechanical component is produced from an electrically non-conductive material, preferably plastic, the insulating layer is not necessary.

According to another preferred embodiment, the electrically conductive CNT layer has at least one input contact and at least one output contact. As already mentioned, the force measurement takes place by means of measurement of the change of electrical resistance of the CNT layer as a consequence of a mechanical stressing of the component. Between the contacts, the CNT layer is preferably flowed through in particular by a constant current, with a change in the electrical resistance resulting in a change in voltage, which can be measured and evaluated as a signal. Alternatively, the measurement can also be taken with a variable, not constant current.

According to another preferred embodiment, the input and output contacts are connected by means of electrical conductors to evaluation electronics and a power source. The evaluation electronics converts the electrical signal, in particular the voltage signal, into a signal which is representative of the measured stress on the component.

According to another preferred embodiment, the CNT layer is formed as a varnish layer adhering to the surface. The CNT material is thus contained in a varnish which can be easily applied to the measurement region of the component and which forms a durable, resilient layer there.

According to another preferred embodiment, the mechanical component is formed as a pendulum support of a chassis, wherein the rod-shaped pendulum support is connected, preferably by means of a ball joint, to a ball stud. The CNT layer or the varnish layer can be applied either to the surface of the pendulum support or preferably to the cylindrically-formed or even slightly conically-formed ball stud. The latter case has the advantage that the axial tensile or compressive force acting in the pendulum support produces a bending stress in the ball stud and is thus intensified. Greater stretching or compression (deformation) and therefore a stronger signal thus occurs in the CNT layer applied to the ball stud, i.e., a more precise measurement is possible.

According to another aspect of the invention, the use of the CNT material as a sensitive element for a force sensor is envisaged. This provides improved and simplified options for force measurement on mechanical components of any kind.

It shall be understood that the afore-mentioned features of the invention can be used not only in the respective specified combination, but also in other combinations or on their own without exceeding the scope of the invention. A mechanical reversal of the functions of the individual mechanical elements of the invention also lies within the scope of the invention.

BRIEF DESCRIPTION OF THE DRAWINGS

Exemplary embodiments of the invention are depicted in the drawings and are described in greater detail below, and additional features and/or advantages may emerge from the description and/or the drawings, in which FIG. 1 shows a force sensor according to the invention with a CNT layer on a pendulum support, FIGS. 2A, 2B, 2C show a schematic depiction of CNT layers and FIG. 3 shows an enlargement of detail A of FIG. 1 which shows the force sensor.

DETAILED DESCRIPTION OF THE PREFERRED EMBODIMENTS

FIG. 1 shows a shortened, rod-shaped pendulum support 1, which is connected in an articulated manner by means of its free end to a stabilizer, not depicted, of a chassis for a motor vehicle. The pendulum support 1, which constitutes an exemplary embodiment of a mechanical component, is stressed with an axial force $F_{Axial}$ and is connected by means of a ball joint 2 to a ball stud 3, the ball stud 3 having a ball head 3a, a shaft 3b and a threaded section 3c. By means of this threaded section 3c, the ball stud 3 is firmly connected in a not depicted manner to another chassis component, e.g., a suspension strut. The ball stud 3 is thus—from a static perspective—clamped in the region of the threaded section 3c, while the axial force $F_{Axial}$ acts on the ball head 3a and thus applies a bending moment to the shaft 3b and a force acting radially on the ball of the ball joint. Bending stress is consequently produced in the region of the shaft 3b, which bending stress consists of compressive and tensile stress. The deformations resulting from the tensile and compressive stress, i.e., on the one hand stretching and on the other hand compression in the region of the surface of the shaft 3b, should be measured. The amount of bending stress in the region of the shaft 3b is much greater than the amount of compressive stress in the pendulum support 1, so that an intensification effect is produced.

According to the invention, an insulating layer 4 is applied to the surface of the shaft 3b and a layer of carbon nanotubes is applied to the insulating layer 4. According to the invention, the carbon nanotubes layer, hereafter referred to simply as the CNT layer, serves as a sensitive element or sensor element of a force sensor and is provided with two electrical contacts, an input contact 6 and an output contact 7. The contacts 6, 7 are connected by means of electrical conductors (without a reference numeral) to evaluation electronics 8 and this is connected by means of an electrical connection (without a reference numeral) to a not depicted power source. The distance between the input and output contacts 6, 7 in the axial direction of the ball stud 3 is identified with x, i.e., this region forms the measurement region of the CNT layer 5 through which a current flows. Relatively strong stretching and compression occurs in this region due to the bending stress, which stretching and compression is conveyed directly to the CNT layer 5, which thus changes its electrical resistance.

FIGS. 2A, 2B and 2C show the construction of various CNT structures 9a, 9b, 9c in schematic depictions. As is known, the CNT material consists of very fine carbon tubes at the nanoscale level, which—as the figure shows—are arranged hexagonally, i.e., they form a honeycomb structure. The CNT material changes its electrical conductivity when it is mechanically stressed.

FIG. 3 shows a detail of an enlargement of detail A of FIG. 1, indicated by a rectangle which is shown by dashed lines. The detail shows the construction of the sensitive element according to the invention for a force sensor. Identical or similar parts are identified using the same reference numerals as in FIG. 1. The insulating layer 4 firstly and subsequently the CNT layer 5 are applied to the cylindrically formed component, which is the shaft 3b in the exemplary embodiment. The insulating layer 4 serves to electrically insulate the electrically conductive CNT layer 5 against the electrically conductive component 3b. The CNT layer 5 has electrical contacts 6, 7 on its two axially offset ends, which electrical contacts are connected to electrical conductors 6a, 7a. The electrical conductors 6a, 7a are connected to the evaluation electronics 8 depicted in FIG. 1. The CNT layer 5 can preferably be formed as the CNT constituent-binding varnish layer, which can be particularly easily applied to the component 3b.

The force sensor according to the invention with the sensitive element formed as the CNT layer 5 functions as follows: When the pendulum rod 1 is stressed by means of the axial force $F_{Axial}$, the clamped shaft 3b of the ball stud 3 is subject to bending stress so that, in the region x of the shaft 3b, greater stretching (in the fiber in tension) and compression (in the fiber under compression) occurs. These deformations are conveyed directly to the CNT layer 5 which is firmly connected to the surface of the shaft 3b, so that the CNT layer 5 is also subject to these deformations. This leads to a change in the electrical resistance of the CNT layer 5. Due to the contacts 6, 7, this CNT layer is preferably flowed through with a constant current so that, in the event of changes in the electrical resistance, a change occurs in the voltage, which is supplied to the evaluation electronics 8 and is utilized as a signal. Using the electrical signal, the axial force acting in the pendulum rod 1 can be calculated on the basis of the laws of mechanics. The calculated axial force variable serves as an output variable for active roll stabilization of the vehicle.

REFERENCE NUMERALS 1 pendulum support
2 ball joint
3 ball stud
3a ball head
3b shaft
3c threaded section
4 insulating layer
5 CNT layer
6 input contact
6a electrical conductor
7 output contact
7a electrical conductor
8 evaluation electronics
9a CNT structure
9b CNT structure
9c CNT structure
x Measurement region
$F_{Axial}$ Axial force

The invention claimed is:
1. A mechanical component for a vehicle comprising:
a cylindrical measurement region of a ball stud (3) having an outer surface,
a force sensor associated with the cylindrical measurement region for detecting at least one force to which the mechanical component is exposed, the force sensor comprising a layer (5) of carbon nanotubes, and the layer (5) of carbon nanotubes being applied to the outer surface of the cylindrical measurement region (x).

2. The mechanical component according to claim 1, wherein an insulating layer (4) is disposed between the layer (5) of carbon nanotubes and the outer surface of the cylindrical measurement region (x) of the mechanical component (3*b*).

3. The mechanical component according to claim 1, wherein the layer (5) of carbon nanotubes forms an electrically conductive connection and has at least one input contact (6) and at least one output contact (7).

4. The mechanical component according to claim 3, wherein the input and the output contacts (6, 7) are connected, by electrical conductors (6*a*, 7*a*), to evaluation electronics (8) and a power source.

5. The mechanical component according to claim 1, wherein the layer (5) of carbon nanotubes is formed as a varnish layer which adheres to the outer surface of the cylindrical measurement region (x) of the mechanical component (3*b*).

6. The mechanical component according to claim 1, wherein either the layer (5) of carbon nanotubes or a varnish layer, that forms the layer (5) of carbon nanotubes, is applied to the shaft (3*b*) of the ball stud (3).

7. A mechanical component for a vehicle comprising:

a cylindrical measurement region of a shaft of a ball stud (3*b*), the cylindrical measurement region of the shaft of the ball stud having an outer surface, a force sensor being associated with the cylindrical measurement region for determining stress forces to which the shaft of the ball stud is exposed, the force sensor comprising a layer of carbon nanotubes, the layer of the carbon nanotubes being coated on the outer surface of the cylindrical measurement region of the shaft of the ball stud, the layer of carbon nanotubes being electrically conductive and having an electrical resistance that changes based on mechanical stress placed on the carbon nanotubes, the layer of the carbon nanotubes having an input contact and an output contact, and the input and the output contacts being connected, via electrical conductors, to evaluation electronics and evaluate voltage signals are transmitted between the evaluation electronics and the layer of the carbon nanotubes for determining a stress force to which the shaft of the ball stud is exposed.

8. The mechanical component for a vehicle according to claim 1, wherein the at least one force comprises compressive and/or tensile stress.

9. The mechanical component for a vehicle according to claim 7, wherein the stress forces comprise compressive and/or tensile stress forces.

10. The mechanical component for a vehicle according to claim 4, wherein the power source produces a constant current through the layer of carbon nanotubes.

11. The mechanical component for a vehicle according to claim 7, further comprising a power source that produces a constant current through the layer of nanotubes.

\* \* \* \* \*